No. 741,797. PATENTED OCT. 20, 1903.
E. D. JOHNSON.
SPRING WHEEL.
APPLICATION FILED FEB. 13, 1903.
NO MODEL.
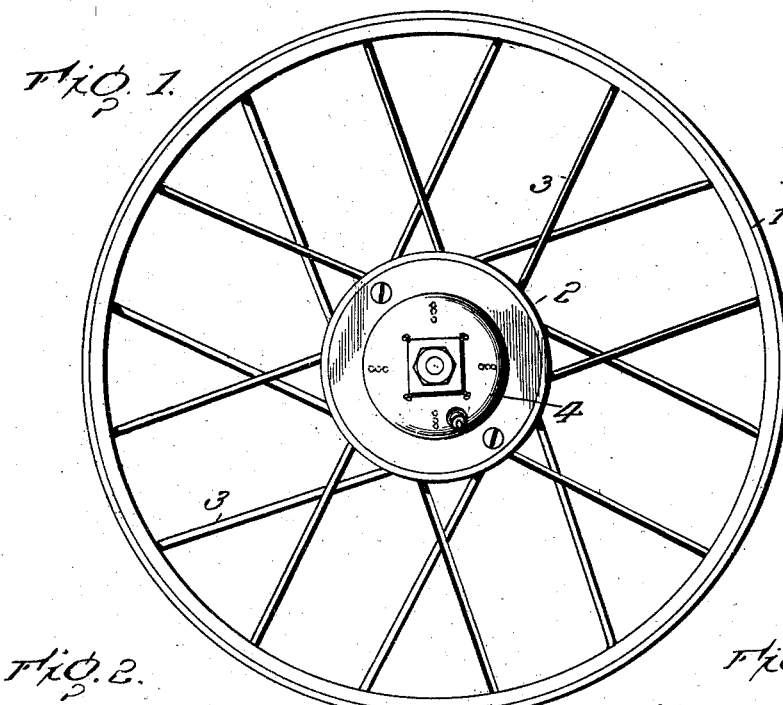
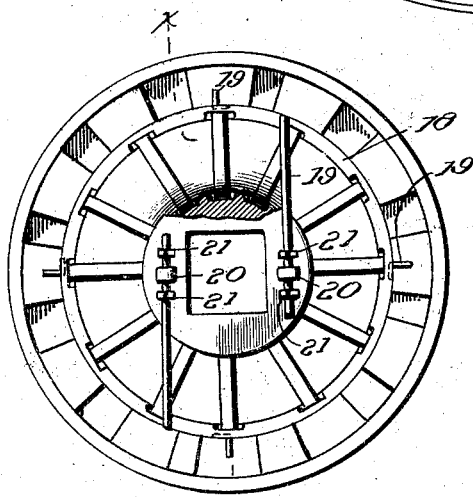
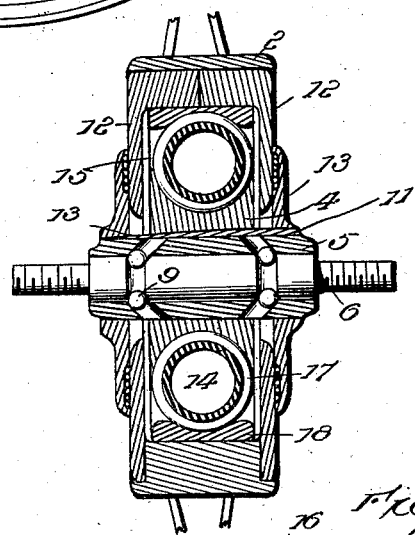
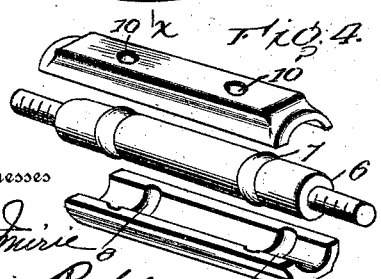
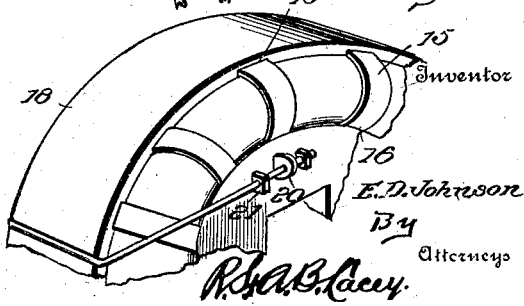
Witnesses
Inventor
E. D. Johnson
By
Attorneys No. 741,797. Patented October 20, 1903.

UNITED STATES PATENT OFFICE.

EDWARD D. JOHNSON, OF COVINGTON, VIRGINIA.

SPRING-WHEEL.

SPECIFICATION forming part of Letters Patent No. 741,797, dated October 20, 1903.

Application filed February 13, 1903. Serial No. 143,259. (No model.)

*To all whom it may concern:*

Be it known that I, EDWARD D. JOHNSON, a citizen of the United States, residing at Covington, in the county of Alleghany and State of Virginia, have invented certain new and useful Improvements in Spring-Wheels, of which the following is a specification.

This invention relates to vehicle-wheels designed to compensate for and neutralize vibration and prevent transmission of jar and jolt to the occupants of the carriage or other conveyance equipped with running-gear having yieldable supporting-wheels.

The invention relates most especially to the compensating means interposed between the hub of the wheel and the main portion, whereby friction and wear are minimized and the parts readily accessible for any purpose.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of a wheel embodying the invention. Fig. 2 is a side view of the central portion of the wheel, having the end plates removed. Fig. 3 is a vertical section about on the line X X of Fig. 2. Fig. 4 is a detail perspective view of the axle and box therefor, the latter being separated. Fig. 5 is a detail perspective view of the central or hub portion of the wheel.

Corresponding and like parts are referred to in the following description and indicated in all the views of the drawings by the same reference characters.

The main or body portion of the wheel comprises the outer rim 1, inner rim 2, and connecting-spokes 3, the latter being of any structural type and connected to the parts 1 and 2 in any accustomed way.

The hub portion of the wheel comprises the hub 4 and box 5, the latter being of angular form and fitted within a corresponding opening of the hub and composed of similar sections. The axle 6, mounted in the box 5, is provided with annular grooves 7 to match corresponding grooves 8 in the inner walls of the box, the grooves 7 and 8 unitedly forming raceways for reception of balls 9, whereby the axle is locked to the box when the parts are properly assembled. Openings 10 are formed in a side of the box and communicate with the grooves 8 or raceways and admit of introduction of the balls 9, said openings being closed by means of a shim 11, likewise serving to secure the hub 4 and box 5.

Plates 12 are secured to opposite sides of the inner rim 2 and overlap corresponding sides of the hub 4 and are centrally apertured, the central openings being sufficiently large to admit of relative play of the body of the wheel with reference to the hub portion. Covering-plates 13 are secured to the end portions of the axle-box 5, and their outer portions overlap the plates 12 and bear against the same to prevent the entrance of dust, mud, and like matter between the plates 12 and 13. The plates 13 cover the central openings of the plates 12 and serve in a measure to laterally brace the wheel and resist lateral stress.

A cushioning or yielding device is interposed between the hub and body portions of the wheel and may be of any structural type, the same, as illustrated, being pneumatic and comprising a tube 14, provided at intervals in its length with outer ribs 15 for the dual purpose of strengthening the tube and forming positive interlocking means between same and the parts 2 and 4. The pneumatic tube 14 is fitted into seats formed in the opposing edges of the hub 4 and rim 2, each being channeled to receive the tube and provided with transverse depressions 16 to receive opposite portions of the ribs 15, whereby the same positively engage or interlock with the parts 2 and 4, so as to cause the hub and body portions of the wheel to turn as one part. When the tube 14 is deflated, it may be readily placed in position or removed, and after being properly positioned and inflated it enters the seats in the hub and inner rim and causes the ribs 15 to interlock with each in the manner stated.

The friction between the plates 12 and 13 is reduced to a minimum amount by the interposition of ball or antifriction bearings 17.

If desired, a ring, as 18, may be interposed between the pneumatic cushion and the rim 2. To prevent turning of the ring 18, it is provided with outer extensions 19, secured thereto and adapted to enter grooves formed in the inner wall of the rim 2, as shown most clearly in Fig. 2. The plates 12 have cogs upon their inner sides to enter corresponding recesses of the rim 2, so as to interlock therewith and compel rotation of the plates 12 with the body portion of the wheel when same moves under peripheral stress. To prevent overstraining of the pneumatic tube 14 or cushioning device, rods 19 are provided and secured at their outer ends to the rim 2 and at their inner ends to the hub 4, the inner end portions of said rod passing through eyes or keepers 20, attached to the hub, the end portions of said rods 19 being threaded to receive nuts 21, which constitute adjustable stops.

Having thus described the invention, what is claimed as new is—

1. In a yieldable wheel, the combination, of a hub provided with an annular seat and transverse depressions at intervals in the length of said seat, a rim also provided with transverse depressions corresponding to those upon the hub, a cushioning device consisting of a pneumatic tube interposed between the rim and hub, annular ribs disposed at intervals upon said tube and adapted to enter the transverse depressions of the rim and hub, whereby the latter are substantially interlocked, substantially as set forth.

2. In a yieldable wheel, the combination, of a hub provided with an annular seat and transverse depressions at intervals in the length of said seat, a rim also provided with transverse depressions corresponding to those upon the hub, a cushioning device consisting of a pneumatic tube interposed between the rim and hub, annular ribs disposed at intervals upon said tube and adapted to enter the transverse depressions of the rim and hub, whereby the latter are substantially interlocked, and rods having their outer portions in engagement with the rim and their inner ends secured to the hub, whereby overstraining of the cushioning device is obviated, substantially as described.

In testimony whereof I affix my signature in presence of two witnesses.

EDWARD D. JOHNSON. [L. S.]

Witnesses:
J. H. WALKER,
C. H. HUNTER.